US012786684B2

(12) United States Patent
Robinson

(10) Patent No.: US 12,786,684 B2
(45) Date of Patent: Nov. 3, 2026

(54) AUTHENTICATION OF USER EQUIPMENT (UE) FOR NETWORK REGISTRATION WITH UE MOBILITY REGISTRATION UPDATE (MRU)

(71) Applicant: Boost SubscriberCo L.L.C., Englewood, CO (US)

(72) Inventor: Xiaowen Robinson, Great Falls, VA (US)

(73) Assignee: Boost SubscriberCo L.L.C., Englewood, CO (US)

( * ) Notice: Subject to any disclaimer, the term of this patent is extended or adjusted under 35 U.S.C. 154(b) by 809 days.

(21) Appl. No.: 18/102,040

(22) Filed: Jan. 26, 2023

(65) Prior Publication Data

US 2024/0259775 A1 Aug. 1, 2024

(51) Int. Cl.
*H04W 8/06* (2009.01)

(52) U.S. Cl.
CPC .................................... *H04W 8/06* (2013.01)

(58) Field of Classification Search
CPC ......... H04W 8/06; H04W 48/18; H04W 8/12; H04W 8/20; H04W 60/04
See application file for complete search history.

(56) References Cited

U.S. PATENT DOCUMENTS

2005/0170842 A1* 8/2005 Chen .................... H04L 12/185 455/454
2010/0248722 A1* 9/2010 Van Bussel ....... H04W 36/1443 455/436
2012/0020290 A1* 1/2012 Kanauchi .......... H04M 1/72418 370/328

(Continued)

FOREIGN PATENT DOCUMENTS

CN 113068222 A * 7/2021 .......... H04L 47/125

OTHER PUBLICATIONS

Tutorial on communication between access networks and the 5G core, Lucas Baleeiro Dominato, Henrique Carvalho de Resende, Cristiano Bonato Both, Johann M. Marquez-Barja, Bruno O. Silvestre, Kleber V. Cardoso, https://arxiv.org/abs/2112.04257, Dec. 2021 (Year: 2021).*

(Continued)

*Primary Examiner* — Yuwen Pan
*Assistant Examiner* — Swati Jain
(74) *Attorney, Agent, or Firm* — Jeremiah J. Baunach; Frontier IP Law PLLC

(57) ABSTRACT

User equipment (UE) in idle mode returns to a coverage area of a first cellular network of a first mobile network operator from using a second cellular network of a second mobile network operator. In response to the UE in idle mode returning to the coverage area of a first cellular network from using a second cellular network, a core network of the first cellular network receives a mobility registration update (MRU) request from the UE. In response to the core network of the first cellular network not being able to retrieve UE context of the UE based on the MRU request, without rejecting the MRU request, the core network of the first cellular network sends an identity request to the UE to provide an identity of the UE to the core network of the first cellular network, enabling registration of the UE on the first cellular network without rejecting the MRU request.

19 Claims, 7 Drawing Sheets

(56) References Cited

U.S. PATENT DOCUMENTS

| | | | | |
|---|---|---|---|---|
| 2019/0059047 | A1* | 2/2019 | Shu | H04W 48/18 |
| 2019/0174449 | A1* | 6/2019 | Shan | H04W 60/04 |
| 2020/0145211 | A1* | 5/2020 | Lee | H04L 9/0825 |
| 2020/0260268 | A1* | 8/2020 | Moisanen | H04W 68/12 |
| 2022/0095202 | A1* | 3/2022 | Jain | H04W 8/02 |
| 2022/0109969 | A1* | 4/2022 | Qaisrani | H04W 4/029 |
| 2022/0174487 | A1* | 6/2022 | Thakolsri | H04W 8/20 |
| 2022/0174488 | A1* | 6/2022 | Lei | H04W 12/06 |
| 2022/0232464 | A1* | 7/2022 | Matolia | H04B 7/18554 |
| 2022/0256407 | A1* | 8/2022 | Chen | H04W 36/0033 |
| 2023/0017914 | A1* | 1/2023 | Siryy | H04W 12/086 |
| 2023/0125555 | A1* | 4/2023 | Gupta | H04W 8/22 370/329 |
| 2023/0145137 | A1* | 5/2023 | De Luca | H04L 63/0861 726/2 |
| 2023/0262457 | A1* | 8/2023 | Baskaran | H04W 8/22 455/410 |
| 2023/0269690 | A1* | 8/2023 | Ramezan | H04L 9/3271 455/435.1 |
| 2023/0284104 | A1* | 9/2023 | Menon | H04W 36/0061 370/331 |
| 2023/0319780 | A1* | 10/2023 | Choi | H04W 68/025 455/458 |
| 2023/0328520 | A1* | 10/2023 | Ryu | H04W 12/08 455/410 |
| 2023/0345340 | A1* | 10/2023 | Han | H04W 36/305 |
| 2024/0205863 | A1* | 6/2024 | Nassar | H04W 60/04 |
| 2024/0251478 | A1* | 7/2024 | Xie | H04W 68/00 |
| 2024/0340837 | A1* | 10/2024 | Kumar | H04W 60/06 |
| 2025/0227451 | A1* | 7/2025 | Li | H04W 60/00 |

OTHER PUBLICATIONS

"5G; 5G System; Cause code mapping between 5GC interfaces; Stage 3 (3GPP TS 29.524 version 15.0.0 Release 15)", ETSI TS 129 524 V15.0.0, Apr. 2019, 14 pages (Year: 2019).*

"5G System Connection Management: CM-Idle and CM-Connected", TechPlayOn https://www.techplayon.com/5g-system-connection-management-cm-idle-and-cm-connecled, Oct. 21, 2019, 4 pages (Year: 2019).*

"Handbook of Green Information and Communication Systems", https:/lwww.sciencedirecl.com/topics/engineering/Registralion-area, 2013, 7 pages (Year: 2013).*

"5G System Connection Management: CM-Idle and CM-Connected", TechPlayOn https://www.techplayon.com/5g-system-connection-management-cm-idle-and-cm-connected/#:~:text=CM%2DIdle%20define%20a%20state,RRC%2DConnected%20and%20RRC%2DInactive, Oct. 21, 2019, 4 pages.

"5G; 5G System; Cause code mapping between 5GC interfaces; Stage 3 (3GPP TS 29.524 version 15.0.0 Release 15)", ETSI TS 129 524 V15.0.0, Apr. 2019, 14 pages.

"5G-Idle Mode (CM-Idle and RRC-Idle): What and Why", Apeksha Telecom Services Private Limited https://www.linkedin.com/pulse/5g-idle-mode-cm-idle-rrc-idle-what-why-myapekshatelecom/?trk=organization-update-content_share-article, Feb. 15, 2022, 4 pages.

"Handbook of Green Information and Communication Systems", https://www.sciencedirect.com/topics/engineering/registration-area, 2013, 7 pages.

* cited by examiner

AUTHENTICATION OF USER EQUIPMENT (UE) FOR NETWORK REGISTRATION WITH UE MOBILITY REGISTRATION UPDATE (MRU)

BRIEF SUMMARY

The advent and implementation of Fifth Generation (5G) wireless technology has resulted in faster speeds, better flexibility and increased bandwidth. In 5G wireless networks, Registration is the first procedure the user equipment (UE), such as a cellular telephone or Internet-of-Things (IOT) device, executes after being powered on. The procedure is performed to make it possible to receive services from the network. The Registration procedure is also performed during the time the UE is connected to the network. There are several usages of the Registration procedure as indicated below.

Initial Registration is used by the UE to connect to the network after power-on.

Periodic Registration is used by a UE that is in an idle mode (e.g., Connection Management-Idle (CM-Idle) mode or Radio Resource Control-Idle (RRC-Idle) mode) to show to the network that the UE is still there. A UE is in 5G idle mode when no Non Access Stratum (NAS) signaling connection exists between the UE and the network. In idle mode, there exists no UE context in the Next Generation Radio Access Network (NG-RAN), and there is no N2 or N3 connection either to the Access and Mobility Management Function (AMF) or User Plane Function (UPF) of the of the core network (e.g., the 3rd Generation Partnership Project (3GPP) 5G core network (5GC)). For example, a cellular telephone may be in idle mode when registered on a network, but there is no cellular telephone call or data session presently occurring on the cellular telephone. In a 5G New Radio (5G NR) cellular network, when the UE is in RM_REGISTERED/CM_CONNECTED mode, a Connection Management (CM) context has been established in the UE (i.e., UE context) and the UE is being tracked at cell-level granularity. The periodicity of the Periodic Registration is based on a time value received from the AMF.

Emergency Registration is used by the UE when it wants to register for emergency services only.

Mobility Registration is used by the UE in case it moves out of the coverage area or Registration Area, or when the UE needs to update its capabilities or other parameters that are negotiated in the Registration procedure with or without changing to a new tracking area (TA). Mobility Registration may be performed using a Mobility Registration Update (MRU), which is a generic mobility control mechanism that can be used to communicate handover and re-registration information between the UE and the Next Generation Node B (gNB) associated with a cell in a 5G NR cellular network during mobility.

Mobility Registration may be performed while the UE is in idle mode. However, while the UE is in idle mode it may be that the MRU fails with NAS Mobility Management (5GMM) cause code #9: "UE identity cannot be derived by the network" when the UE comes back to the coverage area or Registration Area of the mobile network operator to which the UE is subscribed using a roaming partner's Global Unique Temporary Identifier (GUTI). For example, a roaming partner may not support idle mode mobility (especially when the roaming agreement is N26 support from HPLMN to VPLMN but not the opposite direction) with the cellular network of a mobile network operator to which the UE is subscribed when the UE returns to a coverage or registration area of that cellular network from using the roaming partner's network while the UE is in idle mode. This causes the UE to have to perform an Initial Registration instead when returning to coverage or Registration Area of the cellular network of the mobile network operator to which the UE is subscribed.

As a solution to the above problem in Mobility Registration when the UE is in idle mode, according to an example embodiment, a core network of a first cellular network of a first mobile network operator may receive an MRU request from a UE currently in idle mode and subscribed to the first mobile network operator. In response to the core network of the first cellular network not being able to retrieve UE context of the UE based on the MRU request, without rejecting the MRU request, the core network of the first cellular network sends an identity request to the UE to provide an identity of the UE to the core network of the first cellular network. The core network of the first cellular network receives the identity of the UE (e.g., a Subscription Concealed Identifier (SUCI) of the UE or a Subscription Permanent Identifier (SUPI) of the UE) in response to the request and performs authentication, authorization and mobility registration of the UE on the first cellular network of the first mobile network operator based on the received identity of the UE. This enables the UE to register on the first cellular network without the UE having to perform an initial registration procedure to register on the first cellular network.

DETAILED DESCRIPTION

The following description, along with the accompanying drawings, sets forth certain specific details in order to provide a thorough understanding of various disclosed embodiments. However, one skilled in the relevant art will recognize that the disclosed embodiments may be practiced in various combinations, without one or more of these specific details, or with other methods, components, devices, materials, etc. In other instances, well-known structures or components that are associated with the environment of the present disclosure, including but not limited to the communication systems and networks, have not been shown or described in order to avoid unnecessarily obscuring descriptions of the embodiments. Additionally, the various embodiments may be methods, systems, media, or devices. Accordingly, the various embodiments may be entirely hardware embodiments, entirely software embodiments, or embodiments combining software and hardware aspects.

Throughout the specification, claims, and drawings, the following terms take the meaning explicitly associated herein, unless the context clearly dictates otherwise. The term "herein" refers to the specification, claims, and drawings associated with the current application. The phrases "in one embodiment," "in another embodiment," "in various embodiments," "in some embodiments," "in other embodiments," and other variations thereof refer to one or more features, structures, functions, limitations, or characteristics of the present disclosure, and are not limited to the same or different embodiments unless the context clearly dictates otherwise. As used herein, the term "or" is an inclusive "or" operator, and is equivalent to the phrases "A or B, or both" or "A or B or C, or any combination thereof," and lists with additional elements are similarly treated. The term "based on" is not exclusive and allows for being based on additional features, functions, aspects, or limitations not described, unless the context clearly dictates otherwise. In addition, throughout the specification, the meaning of "a," "an," and "the" include singular and plural references.

Figure 1:
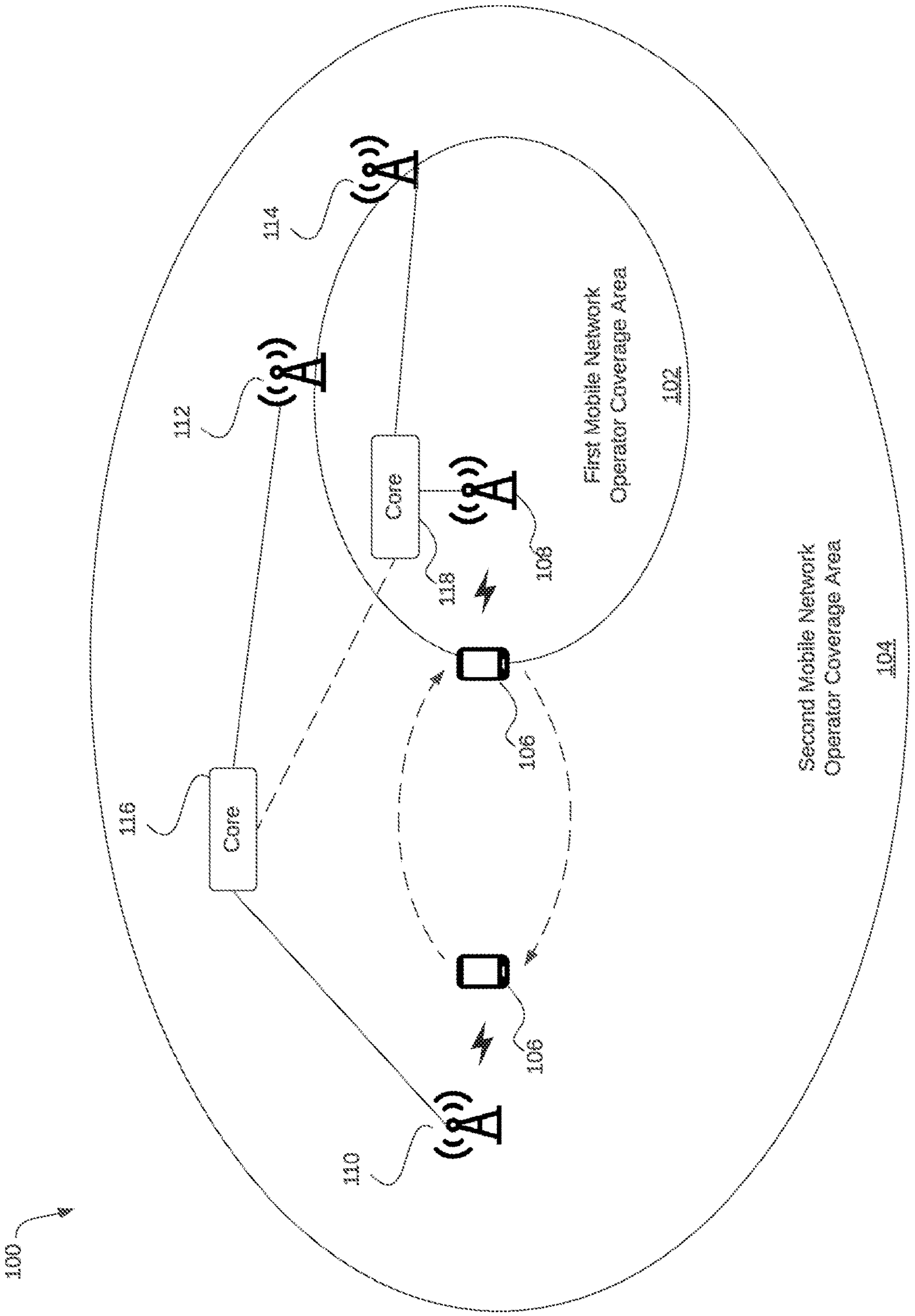
FIG. 1 illustrates a diagram of UE moving to a roaming partner's cellular network and back to a cellular network of a mobile network operator to which the UE is subscribed in accordance with embodiments described herein.

FIG. 1 illustrates a network diagram 100 of UE 106 moving to a roaming partner's cellular network and back to a cellular network of a mobile network operator to which the UE is subscribed in accordance with embodiments described herein.

Shown in network diagram 100 is a first mobile network operator coverage area 102. In an example embodiment, the first mobile network operator coverage area 102 may be a cellular network coverage area or Registration Area of a mobile network of a mobile network operator to which UE 106 is subscribed. In various embodiments, the first mobile network operator coverage area 102 may be a coverage area of a 5G NR wireless network.

Also shown in network diagram 100 is a second mobile network operator coverage area 104. In an example embodiment, the second mobile network operator coverage area 104 may be a cellular network coverage area or registration area of a mobile network of a mobile network operator that is a roaming partner to the first mobile network operator. A roaming partner—may be a mobile network operator who provides wholesale cellular wireless services to subscribers of the first mobile network operator based on one or more roaming agreements signed between the first mobile network operator and the roaming partner. For example, UE 106 may be able to use second mobile network operator coverage area 104 of the second mobile network operator when moving outside the first mobile network operator coverage area 102. In various embodiments, the first mobile network operator coverage area 102 may be a coverage area of a 5G NR wireless network.

Each of the coverage areas (i.e., first mobile network operator coverage area 102 and second mobile network operator coverage area 104) is provided cellular service by one or more respective cellular radio towers and associated gNBs in the respective radio access networks (RANs) of the first mobile network operator and the second mobile network operator. Example cellular radio towers shown in network diagram 100 include first mobile network operator radio tower 108, first mobile network operator radio tower 114, second mobile network operator radio tower 110 and second mobile network operator radio tower 112. While only two radio towers are shown for each mobile network operator and each coverage area in network diagram 100 as examples, additional radio towers in each coverage area and additional coverage areas may be present in various embodiments.

Also, each radio tower in network diagram 100 is shown connected to a respective core network (core) of the mobile network of the respective mobile network operator. In 5G NR, the 5G Core (5GC) is the heart of a 5G network, controlling data and control plane operations. The 5GC, which includes the AMF (not shown), establishes reliable, secure connectivity to the network for UE and provides access to its services. The core domain handles a wide variety of essential functions in the mobile network, such as connectivity and mobility management, authentication and authorization, subscriber data management and policy management, among others. 5GC network functions are completely software-based and designed as cloud-native, meaning that they're agnostic to the underlying cloud infrastructure, allowing higher deployment agility and flexibility. The AMF receives all connection and session related information from the UE (via N1/N2 interfaces) but is responsible only for handling connection and mobility management tasks. All messages related to session management are forwarded over the N11 reference interface to the Session Management Function (SMF).

As a mobile network comprises many AMF instances, a Globally Unique AMF Identifier (GUAMI) is employed. The UE specifies this in the first Non-Access Stratum (NAS) message it sends, which is routed to the required AMF by the Radio Access Network (RAN). Applicable to both 3GPP access and non-3GPP access, the GUAMI also ensures that messages from a UE, possibly registered through multiple access networks, get forwarded to the same AMF. The Non-3GPP Interworking Function (N3IWF) is responsible for routing messages outside the 5G RAN. Performing the role of access point to the 5G core, thereby terminating RAN control plane and UE traffic originating on either the N1 or N2 reference interface, the AMF implements NAS ciphering and integrity protection algorithms. Following the initial NAS message, the AMF sends an Authentication and Key Agreement (AKA) request in an equivalent manner to the Mobile Management Entity (MME) in Evolved Packet Core (EPC) infrastructures. This precedes the UE authorization process, in which the 5G Core Service Based Architecture (SBA) Unified Data Management (UDM) function supersedes the Home Subscriber Server (HSS). This is performed over the N8 reference interface and therefore employs the HTTP/2 Service Based Interface (SBI) message bus.

As shown in network diagram 100, first mobile network operator radio tower 108 and first mobile network operator radio tower 114 are operably connected to core 118 of the first cellular network of the first mobile network operator, while second mobile network operator radio tower 110 and second mobile network operator radio tower 112 are operably connected to core 116 of the second cellular network of the second mobile network operator (e.g., a roaming partner of the first mobile network operator). Also, shown is a dashed line representing any necessary communication between core 118 of the mobile network of the first mobile network operator and core 116 of the mobile network of the second mobile network operator to facilitate handoff and mobility when UE 106 is roaming into second cellular network coverage area 104. For example, in 5G such communication may be over the N26 interface, which is an inter-Core Network (inter-CN) interface between AMF and the MME in order to enable interworking between the 5G core and Evolved Packet Core (EPC), and the N14 interface, which is an interface to connect two AMFs belonging to two different mobile network operators or serving two public land mobile networks (PLMNs).

Mobility Registration may be used, for example, by the UE 106 when it moves out of first mobile network operator coverage area 102 of the mobile network operator to which it is subscribed into second mobile network operator coverage area 104 of a roaming partner as shown in network diagram 100. The roaming partner's GUTI may be assigned to UE 106 when it moves into second mobile network operator coverage area 104 of the roaming partner. Mobility Registration may be performed using MRU, which is a generic mobility control mechanism that can be used to communicate handover and re-registration information between the UE 106 and the respective gNB. For example, this may include communication during mobility between UE 106 and first mobile network operator radio tower 108 associated with a cell in the respective first cellular network coverage area 102 and between UE 106 and second mobile network operator radio tower 110 associated with a cell in the second cellular network coverage area 104.

Mobility Registration may be performed while the UE 106 is in idle mode. However, while UE 106 is in idle mode it may be that the MRU fails with NAS Mobility Management (5GMM) cause code #9: "UE identity cannot be derived by the network" when UE 106 comes back to the first mobile network operator coverage area 102 using the Globally Unique Temporary Identifier (GUTI) allocated by the AMF of the roaming partner's core 116. The GUTI is a temporary identifier and hence does not have any fixed association with any subscriber or device. A 5G NR GUTI is comprised of the Mobile Country Code (MCC), Mobile Network Code (MNC), AMF Region Identity, AMF Set Identity, AMF Pointer, and the 5G-Temporary Mobile Subscriber Identity (5G-TMSI), which identifies the device. The GUTI is concatenation of GUAMI and 5G-TMSI. The GUAMI consists of the MCC, MNC, AMF Region Identity, AMF Set Identity and AMF Pointer. In an example embodiment, the GUTI may indicate MCC: a and MNC: b or MCC: c and MNC: d Prior to a 5G roaming deployment with the second mobile network operator, the GUTI may be non-native 5G. In another example embodiment, after a 5G roaming deployment with the second mobile network operator, the GUTI may be a 5G native GUTI assigned by the roaming partner.

The GUTI having been allocated to the UE 106 by the AMF of the roaming partner's core 116 when the UE moved to mobile network operator coverage area 104, the roaming partner may not support mobility of UE 106 when returning to the first mobile network operator coverage area 102 while UE 106 is in idle mode. In particular, the roaming partner may not support idle mobility from the roaming network to the home network. Thus, when the UE 106 returns (while UE 106 is in idle mode) to the first mobile network operator coverage area 102 from using the roaming partner's network, core 118 is not able to retrieve UE context of UE 106 from the core 116 based on the GUTI. This causes the UE 106 to have to perform an Initial Registration instead when returning to first cellular network coverage area 102.

Other scenarios in which this may occur may include when the UE 106 is in the first mobile network operator coverage area 102 of the mobile network operator to which it is subscribed, but does not have coverage (e.g., is in a building). The UE 106 may start with initial registration in the roaming partner's coverage area 104 (as the first mobile network operator coverage area 102 is within the roaming partner's coverage area 104) and then move to the first mobile network operator coverage area 102 when UE 106 has coverage again in the first mobile network operator coverage area 102. Also, UE 106 may start in a coverage border area between coverage area 102 and coverage area 104 as shown in diagram 100 and start with initial registration in the roaming partner's coverage area 104 using a Multi-Operator Core Network (MOCN) implemented with the second mobile network operator's public land mobile network (PLMN). The UE 106 may then move to the first mobile network operator coverage area 102. As another example, in coverage area 104, the UE 106 may start with initial registration on the roaming partner's cellular network, using an MOCN implemented with the roaming partner's PLMN. The UE 106 may then move to the first mobile network operator coverage area 102 in a live call (in a scenario where the roaming agreement allows live calls continue staying in roaming partner's network when entering in home network coverage) and then go to idle mode. Each of the above scenarios may cause the UE 106 to have to perform an Initial Registration instead when returning to first cellular network coverage area 102.

Figure 2:
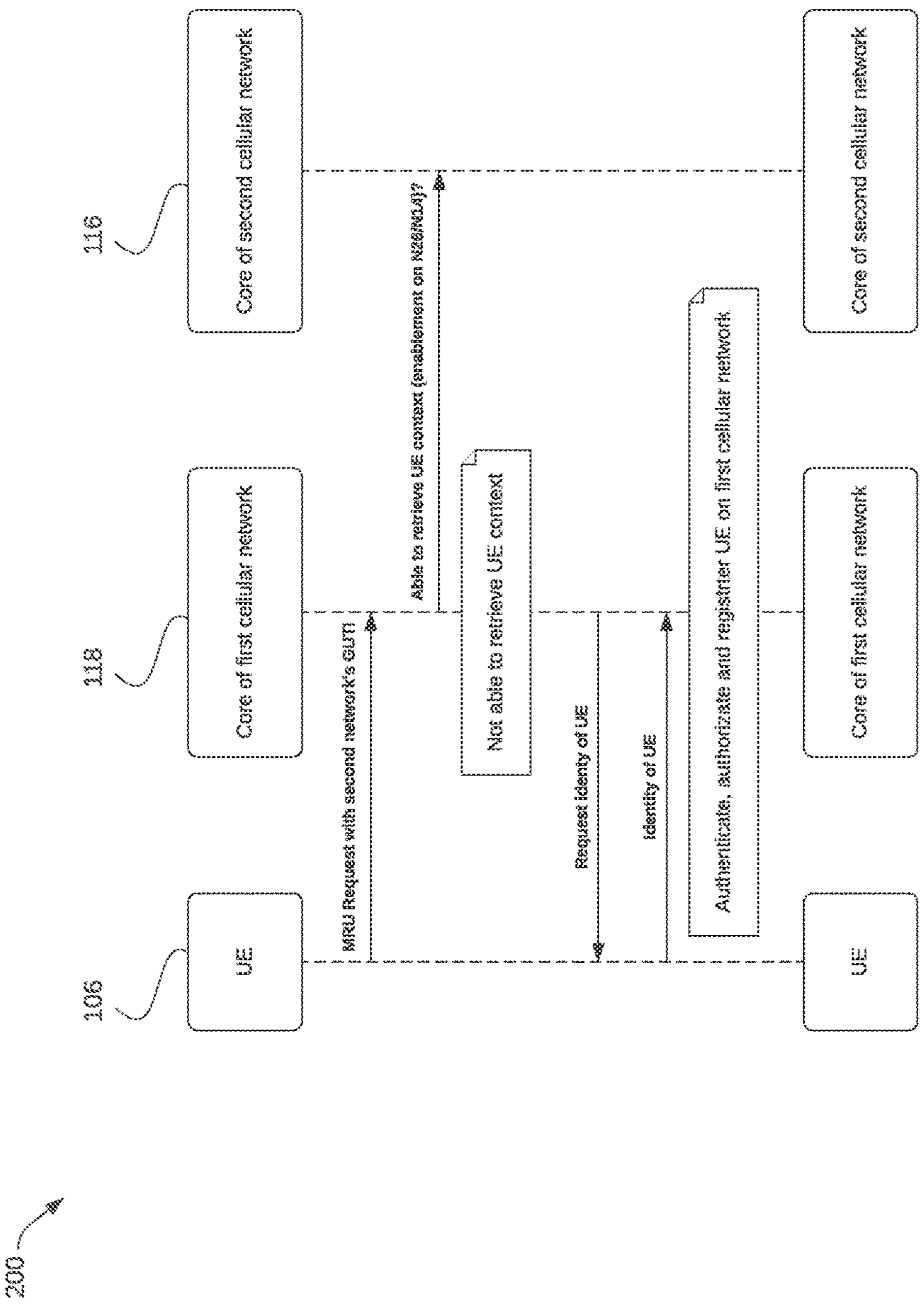
FIG. 2 is a sequence diagram showing an example sequence of operations for authentication of UE for network registration with MRU in accordance with embodiments described herein.

FIG. 2 is a sequence diagram 200 showing an example sequence of operations for authentication of UE for network registration with MRU in accordance with embodiments described herein.

As a solution to the above problem in Mobility Registration described with respect to FIG. 1, core 116 may request for the SUPI/SUCI of UE 106 based on the PLMN changing from that of the roaming partner's and first mobile network operator's MOCN to that of the first mobile network operator. For example, while the UE 106 is in idle mode and subscribed to the first mobile network operator, according to an example embodiment, the core 118 of the first mobile network operator may receive from UE 106 an MRU request including the GUTI assigned by the second mobile network operator (the roaming partner) when UE 106 moves back to the first cellular network coverage area 102 as shown in FIG. 1.

In response to the core 118 not being able to retrieve UE context of UE 106 from the core of the second cellular network 116 based on the GUTI (e.g., if no enablement on N26/N14), without rejecting the MRU request, the core 118 sends an identity request on NAS to the UE 106 to provide an identity of the UE to the core 118 instead of sending NAS CC #9.

Core 118 receives the identity of UE 106 (e.g., a SUCI of the UE 106 or a SUPI of UE 106) in response to the request and performs authentication, authorization and mobility registration of the UE 106 on the first cellular network of the first mobile network operator based on the received identity of UE 106. This enables the UE to register on the first cellular network to which it is subscribed without the UE having to perform an Initial Registration procedure to register on the first cellular network.

Figure 3:
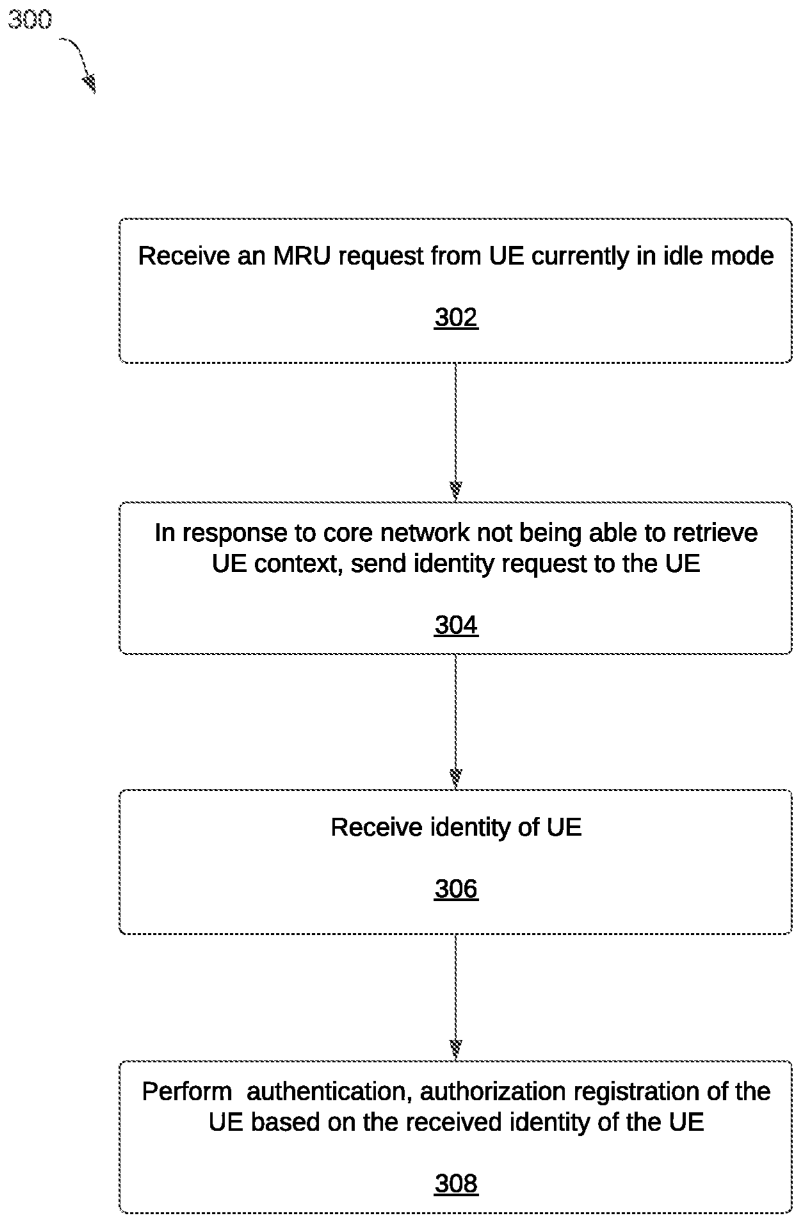
FIG. 3 illustrates a logical flow diagram showing an example embodiment of a process for authentication of UE for network registration with MRU in accordance with embodiments described herein.

FIG. 3 illustrates a logical flow diagram showing an example embodiment of a process 300 for authentication of UE for network registration with MRU in accordance with embodiments described herein.

At 302, a core network of a first cellular network of a first mobile network operator receives a mobility registration update (MRU) request from a user equipment (UE) currently in idle mode and subscribed to the first mobile network operator. An Access and Mobility Management Function (AMF) of the core network of the first cellular network may receive the MRU request from the UE.

At 304, in response to the core network of the first cellular network not being able to retrieve UE context of the UE based on the MRU request, without rejecting the MRU request, the core network of the first cellular network sends an identity request to the UE to provide an identity of the UE to the core network of the first cellular network. The core network may send, via a cellular tower of the first cellular network, the identity request to the UE to provide an identity of the UE to the core network.

At 306, the core network of the first cellular network receives the identity of the UE in response to the request. The core network of the first cellular network may receive, via a cellular tower of the first cellular network, the identity of the UE in response to the request. In an example embodiment, core network of the first cellular network may receive, in response to the request, a Subscription Concealed Identifier (SUCI) of the UE or a Subscription Permanent Identifier (SUPI) of the UE.

At 308, the core network of the first cellular network performs authentication, authorization and mobility registration of the UE on the first cellular network of the first mobile network operator based on the received identity of the UE.

Figure 4:
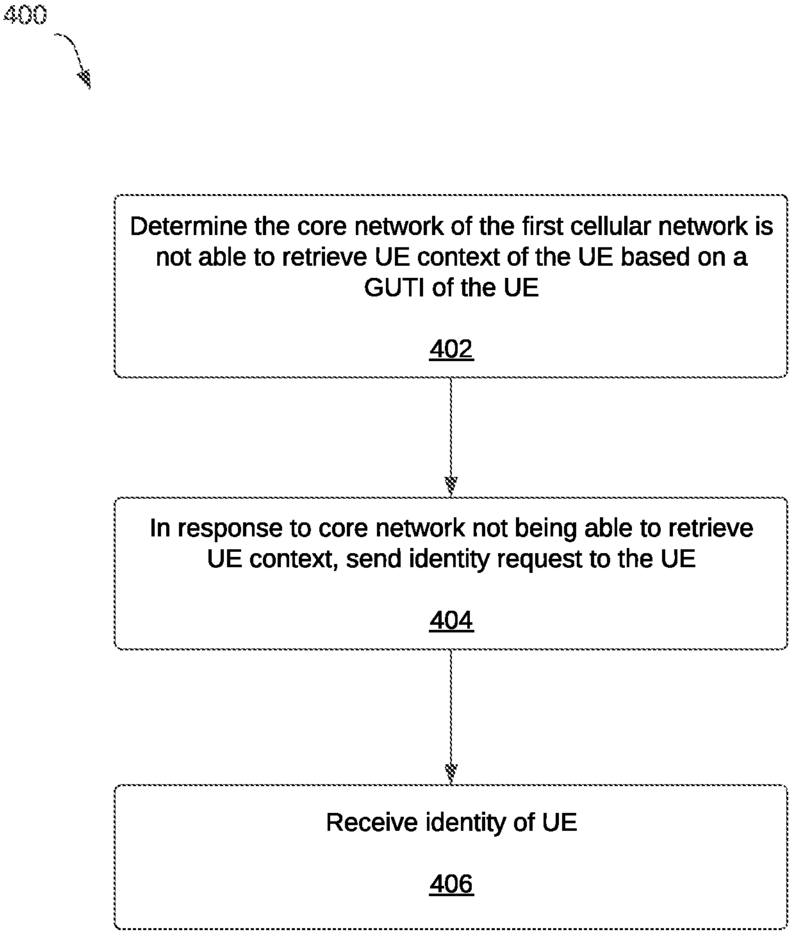
FIG. 4 illustrates a logical flow diagram showing an example embodiment of a process for authentication of UE for network registration with MRU involving determining the core network of a first cellular network is not able to retrieve UE context in accordance with embodiments described herein.

FIG. 4 illustrates a logical flow diagram showing an example embodiment of a process 400 for authentication of UE for network registration with MRU involving determining the core network of a first cellular network is not able to retrieve UE context in accordance with embodiments described herein. In various embodiments, the process 400 may be useful in the process 300 of FIG. 3.

At 402, before the sending the identity request to the UE to provide the identity of the UE to the core network of the first cellular network, the core network of the first cellular network determines the core network of the first cellular network is not able to retrieve UE context of the UE based on a Global Unique Temporary Identifier (GUTI) of the UE provided via the MRU request.

At 404, in response to the core network of the first cellular network not being able to retrieve UE context of the UE based on the MRU request, without rejecting the MRU request, the core network of the first cellular network sends an identity request to the UE to provide an identity of the UE to the core network of the first cellular network.

At 406, the core network of the first cellular network receives the identity of the UE in response to the request.

Figure 5:
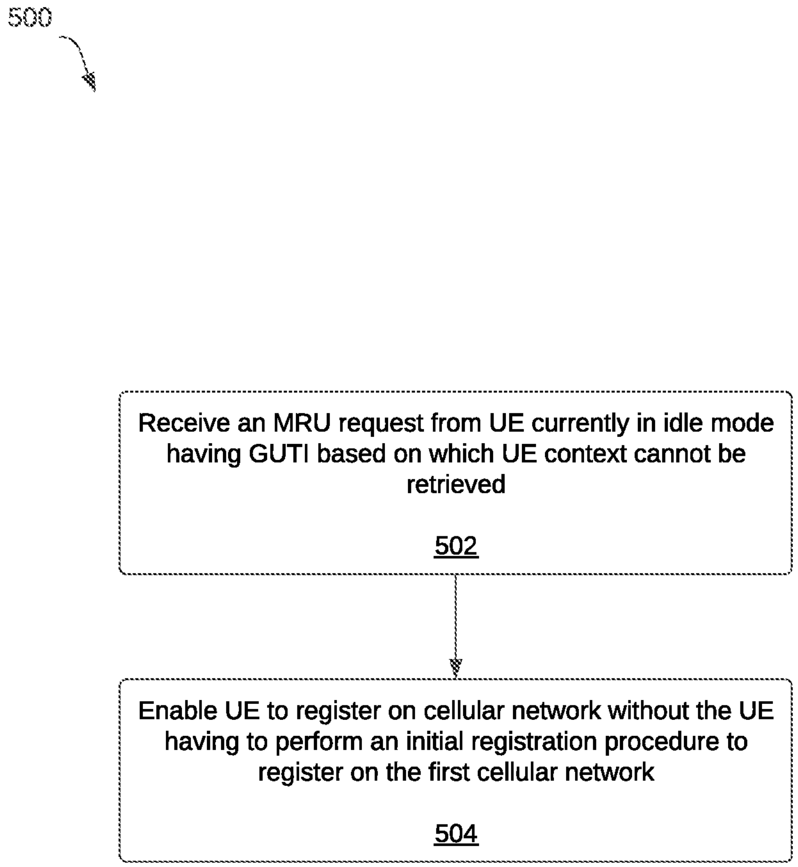
FIG. 5 illustrates a logical flow diagram showing an example embodiment of a process for authentication of UE for network registration with MRU in which an MRU request is received from UE currently in idle mode having a GUTI based on which UE context cannot be retrieved in accordance with embodiments described herein.

FIG. 5 illustrates a logical flow diagram showing an example embodiment of a process 500 for authentication of UE for network registration with MRU in which an MRU request is received from UE currently in idle mode having a GUTI based on which UE context cannot be retrieved in accordance with embodiments described herein. In various embodiments, the process 500 may be useful in the process 300 of FIG. 3.

At 502, a core network of a first cellular network of a first mobile network operator receives an MRU request from a UE that is currently in idle mode, is subscribed to the first mobile network operator and has a GUTI based on which UE context cannot be retrieved.

At 504, in response to the MRU request having the GUTI based on which UE context cannot be retrieved, the core network of the first cellular network enables the UE to register on the first cellular network without the UE having to perform an initial registration procedure to register on the first cellular network.

Figure 6:
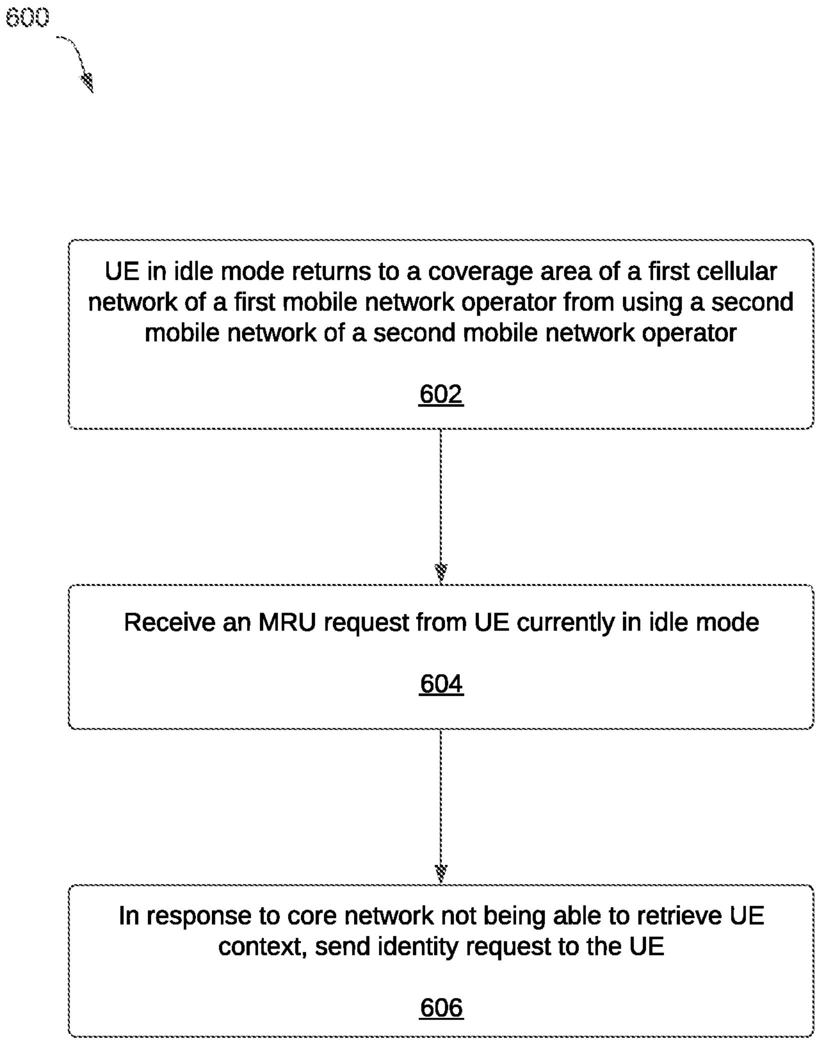
FIG. 6 illustrates a logical flow diagram showing an example embodiment of a process for authentication of UE for network registration with MRU in which the UE returns to a coverage area of a first cellular network of a first mobile network operator from using a second cellular network of a second mobile network operator in accordance with embodiments described herein.

FIG. 6 illustrates a logical flow diagram showing an example embodiment of a process 600 for authentication of UE for network registration with MRU in which the UE returns to a coverage area of a first cellular network of a first mobile network operator from using a second cellular network of a second mobile network operator in accordance with embodiments described herein.

At 602, a UE in idle mode returns to a coverage area of a first cellular network of a first mobile network operator from using a second cellular network of a second mobile network operator. In an example embodiment, the UE is subscribed to the first mobile network operator and the second mobile network operator is a roaming partner of the first mobile network operator.

At 604, in response to the UE in idle mode returning to the coverage area of the first cellular network from using the second cellular network, a core network of a first cellular network of a first mobile network operator receives an MRU request from the UE currently in idle mode.

At 606, in response to the core network of the first cellular network not being able to retrieve UE context of the UE based on the MRU request, without rejecting the MRU request, the core network of the first cellular network sends an identity request to the UE to provide an identity of the UE to the core network of the first cellular network.

Figure 7:
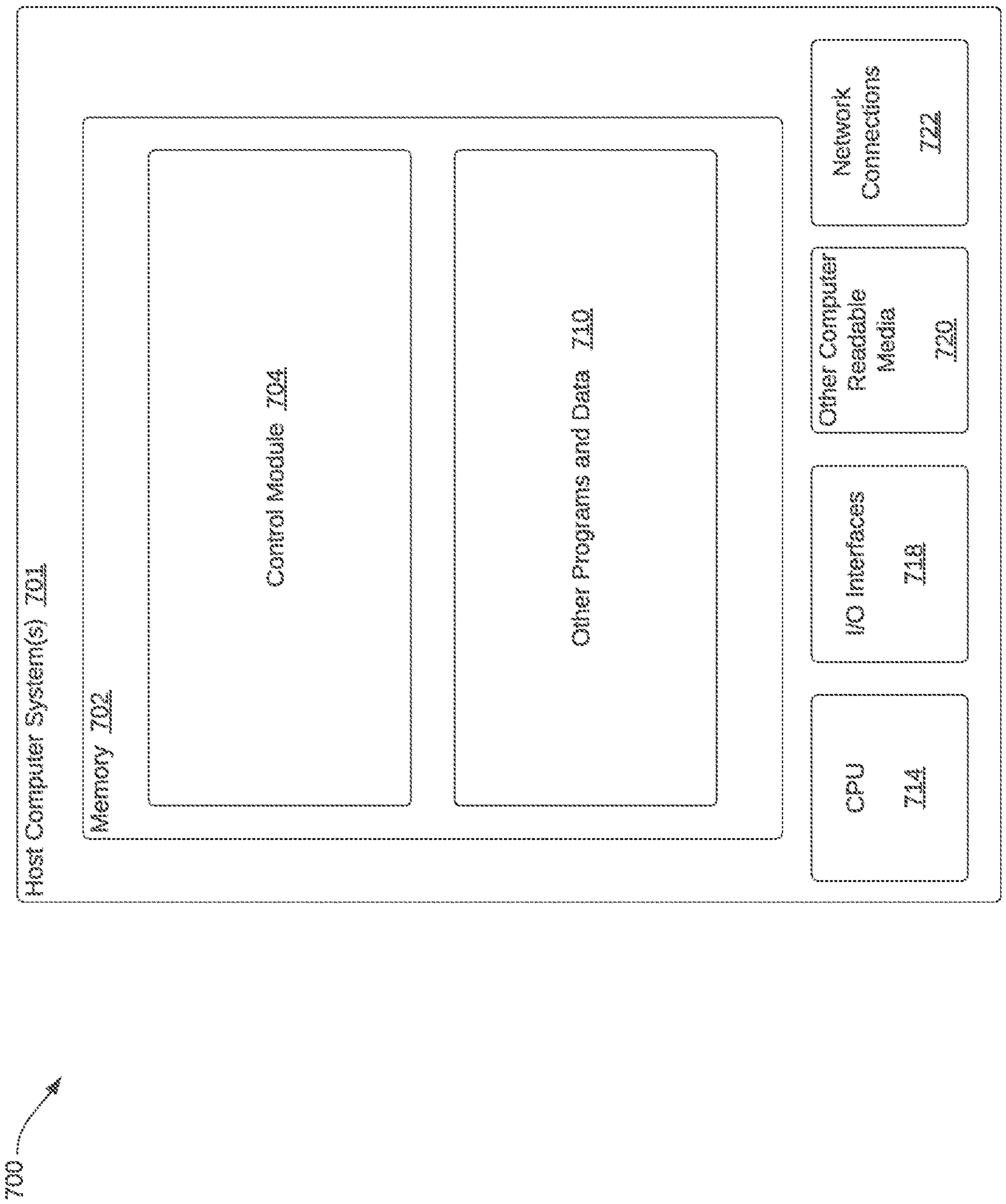
FIG. 7 shows a system diagram that describes an example implementation of computing system(s) for implementing embodiments described herein.

FIG. 7 shows a system diagram that describes an example implementation of computing system(s) for implementing embodiments described herein.

The functionality described herein for authentication of UE for network registration with MRU, or components thereof, can be implemented either on dedicated hardware, as a software instance running on dedicated hardware, or as a virtualized function instantiated on an appropriate platform, e.g., a cloud infrastructure. In some embodiments, such functionality may be completely software-based and designed as cloud-native, meaning that they're agnostic to the underlying cloud infrastructure, allowing higher deployment agility and flexibility. However, FIG. 7 illustrates an example of underlying hardware on which such software and functionality may be hosted and/or implemented.

In particular, shown is example host computer system(s) 701. For example, such computer system(s) 701 may represent one or more of those in various data centers, base stations and cell sites that are, or that host or implement the functions of, aspects described herein to implement authentication of UE for network registration with MRU. In some embodiments, one or more special-purpose computing systems may be used to implement the functionality described herein. Accordingly, various embodiments described herein may be implemented in software, hardware, firmware, or in some combination thereof. Host computer system(s) 701 may include memory 702, one or more central processing units (CPUs) 714, I/O interfaces 718, other computer-readable media 720, and network connections 722.

Memory 702 may include one or more various types of non-volatile and/or volatile storage technologies. Examples of memory 702 may include, but are not limited to, flash memory, hard disk drives, optical drives, solid-state drives, various types of random access memory (RAM), various types of read-only memory (ROM), neural networks, other computer-readable storage media (also referred to as processor-readable storage media), or the like, or any combination thereof. Memory 702 may be utilized to store information, including computer-readable instructions that are utilized by CPU 714 to perform actions, including those of embodiments described herein.

Memory 702 may have stored thereon control module(s) 704. The control module(s) 704 may be configured to implement and/or perform some or all of the functions of the systems, components and modules described herein to implement authentication of UE for network registration with MRU. Memory 702 may also store other programs and data 710, which may include rules, databases, application programming interfaces (APIs), software containers, nodes, pods, software defined data centers (SDDCs), microservices, virtualized environments, software platforms, cloud computing service software, network management software, network orchestrator software, network functions (NF), artificial intelligence (AI) or machine learning (ML) programs or models to perform the functionality described herein, user interfaces, operating systems, other network management functions, other NFs, etc.

Network connections 722 are configured to communicate with other computing devices to facilitate the functionality described herein. In various embodiments, the network connections 722 include transmitters and receivers (not illustrated), cellular telecommunication network equipment and interfaces, and/or other computer network equipment and interfaces to send and receive data as described herein, such as to send and receive instructions, commands and data to implement the processes described herein. I/O interfaces 718 may include a video interfaces, other data input or output interfaces, or the like. Other computer-readable media 720 may include other types of stationary or removable computer-readable media, such as removable flash drives, external hard drives, or the like.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method comprising:

receiving, by a core network of a first cellular network of a first mobile network operator, a mobility registration update (MRU) request from a user equipment (UE) currently in idle mode and subscribed to the first mobile network operator, the MRU request including a first type of identifier of the UE;

in response to the core network of the first cellular network not being able to retrieve UE context of the UE based on the first type of identifier of the UE provided via the MRU request, without rejecting the MRU request, the core network of the first cellular network sending an identity request to the UE to provide an identity of the UE of a second type of identifier different than the first type of identifier to the core network of the first cellular network, wherein the core network of the first cellular network sending an identity request to the UE to provide the identity of the UE of the second type of identifier without rejecting the MRU request includes:

the core network of the first cellular network sending an identity request to the UE to provide the identity of the UE of the second type of identifier without indicating to the UE that the UE identity cannot be derived from the first cellular network;

receiving, by the core network of the first cellular network, the identity of the UE of the second type of identifier in response to the request; and performing, by the core network of the first cellular network, authentication, authorization and mobility registration of the UE on the first cellular network of the first mobile network operator based on the received identity of the UE of the second type of identifier, wherein the mobility registration of the UE includes updating a location of the UE in the first cellular network.

2. The method of claim 1 wherein the receiving the MRU request from the UE subscribed to the first mobile network operator includes:

an Access and Mobility Management Function (AMF) of the core network of the first cellular network receiving MRU request from the UE.

3. The method of claim 1 wherein the core network sending an identity request to the UE to provide an identity of the UE to the core network includes:

the core network sending, via a cellular tower of the first cellular network, the identity request to the UE to provide an identity of the UE to the core network.

4. The method of claim 1 wherein the receiving, by the core network of the first cellular network, the identity of the UE in response to the request includes:

receiving, via a cellular tower of the first cellular network, the identity of the UE in response to the request.

5. The method of claim 1 wherein the receiving, by the core network of the first cellular network, the identity of the UE in response to the request includes:

receiving, in response to the request, a Subscription Concealed Identifier (SUCI) of the UE or a Subscription Permanent Identifier (SUPI) of the UE.

6. The method of claim 1 further comprising:

before the sending an identity request to the UE to provide the identity of the UE to the core network of the first cellular network, determining the core network of the first cellular network is not able to retrieve UE context of the UE based on the first type of identifier of the UE, which is a Global Unique Temporary Identifier (GUTI) of the UE provided via the MRU request.

7. The method of claim 6 wherein the GUTI indicates the GUTI was assigned by a core network of a second cellular network of a second MNO to which the core network the first cellular network does not have connectivity or N26/N14 interface enabled.

8. The method of claim 1 wherein the core network of the first cellular network sending an identity request to the UE to provide the identity of the UE without rejecting the MRU request enables the UE to register on the first cellular network without the UE having to perform an initial registration procedure to register on the first cellular network.

9. The method of claim 1 wherein the receiving the MRU request is caused by the UE returning to a coverage area of the first cellular network of the first mobile network operator from using a second cellular network of a second mobile network operator.

10. The method of claim 9 wherein the second mobile network operator is a roaming partner of first mobile network operator.

11. The method of claim 10 wherein the roaming partner does not support MRU of the UE on the first cellular network of the first mobile network operator when the UE returns to a coverage area of the first cellular network from using the second cellular network while the UE is in idle mode.

12. A system comprising:

at least one memory that stores computer executable instructions; and at least one processor that executes the computer executable instructions to cause operations to be performed, the operations including:

receiving, by a core network of a first cellular network of a first mobile network operator, a mobility registration update (MRU) request from a user equipment (UE) currently in idle mode and subscribed to the first mobile network operator;

in response to the core network of the first cellular network not being able to retrieve UE context of the UE based on the MRU request, without rejecting the MRU request, the core network of the first cellular network sending an identity request to the UE to provide an identity of the UE to the core network of the first cellular network;

receiving, by the core network of the first cellular network, the identity of the UE in response to the request; and performing, by the core network of the first cellular network, authentication, authorization and mobility registration of the UE on the first cellular network of the first mobile network operator based on the received identity of the UE.

13. The system of claim 12 wherein the receiving the MRU request from the UE subscribed to the first mobile network operator includes:

an Access and Mobility Management Function (AMF) of the core network of the first cellular network receiving MRU request from the UE.

14. The system of claim 12 wherein the core network sending an identity request to the UE to provide an identity of the UE to the core network includes:

the core network sending, via a cellular tower of the first cellular network, the identity request to the UE to provide an identity of the UE to the core network.

15. The system of claim 12 wherein the receiving, by the core network of the first cellular network, the identity of the UE in response to the request includes:

receiving, via a cellular tower of the first cellular network, the identity of the UE in response to the request.

16. A non-transitory computer-readable storage medium having computer-executable instructions stored thereon that, when executed by at least one processor, cause the at least one processor to cause actions to be performed, the actions including:

receiving, by a core network of a first cellular network of a first mobile network operator, a mobility registration update (MRU) request from a user equipment (UE) currently in idle mode and subscribed to the first mobile network operator;

in response to the core network of the first cellular network not being able to retrieve UE context of the UE based on the MRU request, without rejecting the MRU request, the core network of the first cellular network sending an identity request to the UE to provide an identity of the UE to the core network of the first cellular network;

receiving, by the core network of the first cellular network, the identity of the UE in response to the request; and performing, by the core network of the first cellular network, authentication, authorization and mobility registration of the UE on the first cellular network of the first mobile network operator based on the received identity of the UE.

17. The non-transitory computer-readable storage medium of claim 16 wherein the receiving the MRU request from the UE subscribed to the first mobile network operator includes:

an Access and Mobility Management Function (AMF) of the core network of the first cellular network receiving MRU request from the UE.

18. The non-transitory computer-readable storage medium of claim 16 wherein the core network sending an identity request to the UE to provide an identity of the UE to the core network includes:

the core network sending, via a cellular tower of the first cellular network, the identity request to the UE to provide an identity of the UE to the core network.

19. The non-transitory computer-readable storage medium of claim 16 wherein the receiving, by the core network of the first cellular network, the identity of the UE in response to the request includes:

receiving, via a cellular tower of the first cellular network, the identity of the UE in response to the request.

* * * * *